United States Patent
Collet et al.

(10) Patent No.: US 10,158,589 B2
(45) Date of Patent: *Dec. 18, 2018

(54) INTERACTIVE AVATAR IN MESSAGING ENVIRONMENT

(71) Applicant: Snap Inc., Venice, CA (US)

(72) Inventors: Jean-Luc Collet, La Gaude (FR); Francois-Xavier Drouet, Nice (FR); Carole Truntschka, St. Laurent du Var (FR)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,953

(22) Filed: Jul. 27, 2017

(65) Prior Publication Data
US 2017/0324688 A1    Nov. 9, 2017

Related U.S. Application Data

(63) Continuation of application No. 14/753,200, filed on Jun. 29, 2015, now Pat. No. 9,749,270, which is a continuation of application No. 12/471,811, filed on May 26, 2009, now Pat. No. 9,105,014.

(30) Foreign Application Priority Data

Feb. 3, 2009  (EP) .................................. 09305104

(51) Int. Cl.
| G06F 15/16 | (2006.01) |
| H04L 12/58 | (2006.01) |
| G06Q 10/10 | (2012.01) |
| G10L 15/26 | (2006.01) |

(52) U.S. Cl.
CPC ........... *H04L 51/08* (2013.01); *G06Q 10/107* (2013.01); *G10L 15/26* (2013.01); *H04L 51/00* (2013.01); *H04L 51/22* (2013.01)

(58) Field of Classification Search
CPC ............................... H04L 51/08; H04L 51/00
See application file for complete search history.

(56) References Cited

U.S. PATENT DOCUMENTS

| 5,826,269 A | 10/1998 | Hussey |
| 6,038,295 A | 3/2000 | Mattes |
| 6,233,318 B1 | 5/2001 | Picard et al. |
| 6,374,292 B1 | 4/2002 | Srivastava et al. |

(Continued)

FOREIGN PATENT DOCUMENTS

| CA | 2887596 A1 | 7/2015 |
| KR | 20040063436 A | 7/2004 |

(Continued)

OTHER PUBLICATIONS

"U.S. Appl. No. 12/471,811, Advisory Action dated Mar. 28, 2012", 6 pgs.

(Continued)

*Primary Examiner* — Hua Fan
(74) *Attorney, Agent, or Firm* — Schwegman Lundberg & Woessner, P.A.

(57) ABSTRACT

Among other things, embodiments of the present disclosure relate to communicating via an avatar embedded in an email message. In some embodiments, the avatar can provide information associated with the email message.

20 Claims, 4 Drawing Sheets

(56) References Cited

U.S. PATENT DOCUMENTS

| | | |
|---|---|---|
| 6,473,794 B1 | 10/2002 | Guheen et al. |
| 6,839,411 B1 | 1/2005 | Saltanov et al. |
| 6,842,779 B1 | 1/2005 | Nishizawa |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 7,627,828 B1 | 12/2009 | Collison et al. |
| 7,639,251 B2 | 12/2009 | Gu et al. |
| 7,689,649 B2 | 3/2010 | Heikes et al. |
| 7,792,789 B2 | 9/2010 | Prahlad et al. |
| 8,131,597 B2 | 3/2012 | Hudetz |
| 8,170,957 B2 | 5/2012 | Richard |
| 8,199,747 B2 | 6/2012 | Rojas et al. |
| 8,332,475 B2 | 12/2012 | Rosen et al. |
| 8,413,059 B2 | 4/2013 | Lee et al. |
| 8,718,333 B2 | 5/2014 | Wolf et al. |
| 8,724,622 B2 | 5/2014 | Rojas |
| 8,738,719 B2 | 5/2014 | Lee et al. |
| 8,874,677 B2 | 10/2014 | Rosen et al. |
| 8,909,679 B2 | 12/2014 | Roote et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,641,870 B1 | 5/2017 | Cormie et al. |
| 9,749,270 B2 | 8/2017 | Collet et al. |
| 2002/0035607 A1 | 3/2002 | Checkoway et al. |
| 2002/0059193 A1 | 5/2002 | Decime et al. |
| 2002/0169644 A1* | 11/2002 | Greene .......... G06Q 10/063112 705/7.18 |
| 2005/0144241 A1 | 6/2005 | Stata et al. |
| 2006/0031412 A1 | 2/2006 | Adams et al. |
| 2006/0145944 A1 | 7/2006 | Tarlton et al. |
| 2007/0011270 A1 | 1/2007 | Klein et al. |
| 2007/0168863 A1 | 7/2007 | Blattner et al. |
| 2007/0176921 A1 | 8/2007 | Iwasaki et al. |
| 2008/0097979 A1 | 4/2008 | Heidloff et al. |
| 2008/0209329 A1 | 8/2008 | Defranco et al. |
| 2008/0216092 A1 | 9/2008 | Serlet |
| 2008/0222108 A1 | 9/2008 | Prahlad et al. |
| 2008/0309617 A1 | 12/2008 | Kong et al. |
| 2009/0030884 A1 | 1/2009 | Pulfer et al. |
| 2009/0055484 A1* | 2/2009 | Vuong ................. G06Q 10/107 709/206 |
| 2009/0099925 A1 | 4/2009 | Mehta et al. |
| 2009/0100367 A1 | 4/2009 | Dargahi et al. |
| 2009/0177976 A1 | 7/2009 | Bokor et al. |
| 2009/0228811 A1 | 9/2009 | Adams et al. |
| 2009/0265604 A1 | 10/2009 | Howard et al. |
| 2009/0319178 A1 | 12/2009 | Khosravy et al. |
| 2009/0328122 A1 | 12/2009 | Amento et al. |
| 2010/0115426 A1 | 5/2010 | Liu et al. |
| 2010/0274724 A1 | 10/2010 | Bible, Jr. et al. |
| 2011/0153759 A1 | 6/2011 | Rathod |
| 2011/0202598 A1 | 8/2011 | Evans et al. |
| 2011/0246330 A1 | 10/2011 | Tikku et al. |
| 2012/0013770 A1 | 1/2012 | Stafford et al. |
| 2012/0209924 A1 | 8/2012 | Evans et al. |
| 2013/0179520 A1 | 7/2013 | Lee et al. |
| 2015/0295866 A1 | 10/2015 | Collet et al. |
| 2017/0113140 A1 | 4/2017 | Blackstock et al. |
| 2018/0113587 A1 | 4/2018 | Allen et al. |

FOREIGN PATENT DOCUMENTS

| | | |
|---|---|---|
| WO | WO-03094072 A1 | 11/2003 |
| WO | WO-2004095308 A1 | 11/2004 |
| WO | WO-2006107182 A1 | 10/2006 |

OTHER PUBLICATIONS

"U.S. Appl. No. 12/471,811, Examiner Interview Summary dated Feb. 2, 2012", 3 pgs.

"U.S. Appl. No. 12/471,811, Examiner Interview Summary dated Apr. 18, 2011", 3 pgs.

"U.S. Appl. No. 12/471,811, Examiner Interview Summary dated May 27, 2014", 2 pgs.

"U.S. Appl. No. 12/471,811, Final Office Action dated Dec. 23, 2011", 20 pgs.

"U.S. Appl. No. 12/471,811, Non Final Office Action dated Jan. 13, 2011", 15 pgs.

"U.S. Appl. No. 12/471,811, Non Final Office Action dated Jun. 28, 2011", 26 pgs.

"U.S. Appl. No. 12/471,811, Non Final Office Action dated Oct. 24, 2014", 21 pgs.

"U.S. Appl. No. 12/471,811, Notice of Allowance dated Apr. 1, 2015", 6 pgs.

"U.S. Appl. No. 12/471,811, Response filed Jan. 26, 2015 to Non Final Office Action dated Oct. 24, 2014", 18 pgs.

"U.S. Appl. No. 12/471,811, Response filed Feb. 23, 2012 to Final Office Action dated Dec. 23, 2011", 12 pgs.

"U.S. Appl. No. 12/471,811, Response filed Mar. 28, 2012 to Advisory Action dated Mar. 28, 2012", 14 pgs.

"U.S. Appl. No. 12/471,811, Response filed Apr. 13, 2011 to Non Final Office Action dated Jan. 13, 2011", 5 pgs.

"U.S. Appl. No. 12/471,811, Response filed Sep. 28, 2011 to Non Final Office Action dated Jun. 28, 2011", 19 pgs.

"U.S. Appl. No. 14/753,200, Non Final Office Action dated Oct. 11, 2016", 6 pgs.

"U.S. Appl. No. 14/753,200, Notice of Allowance dated Apr. 27, 2017", 7 pgs.

"U.S. Appl. No. 14/753,200, Response filed Feb. 13, 2017 to Non Final Office Action dated Oct. 11, 2016", 9 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 15/369,499, Non Final Office Action dated Aug. 15, 2018", 22 pgs.

"U.S. Appl. No. 16/115,259, Preliminary Amendment filed Oct. 18, 2018", 6 pgs.

\* cited by examiner

INTERACTIVE AVATAR IN MESSAGING ENVIRONMENT

PRIORITY

This application is a continuation of and claims the benefit of priority of U.S. patent application Ser. No. 14/753,200, filed on Jun. 29, 2015, which is a continuation of and claims the benefit of priority of U.S. patent application Ser. No. 12/471,811, filed on May 26, 2009, which claims priority to European Patent Application No. 09305104.3, filed Feb. 3, 2009, which are hereby incorporated by reference herein in their entirety.

FIELDS OF THE INVENTION

The present invention generally relates to electronic messaging systems and method. More particularly, the present invention is related to communicating via an avatar embedded in an email message.

DESCRIPTION OF THE PRIOR ART

Internet traffic becomes more and more important everyday and an electronic mail (email) provides a quick and convenient way for Internet users over the world to communicate between them. An email communication is initiated by a message sender composing an email message which optionally includes attached files, and then sending the message to one or more recipient via a network (e.g., Internet).

FIG. 1 illustrates a traditional electronic messaging system. Once an email message is composed by a composer 10 and the composer pushes "send" key/button, the message is delivered to each of the recipients (e.g., a receiver 25) automatically, provided that valid e-mail destination addresses have been specified in the message. An email message may pass through a number of separate server devices, generally SMTP (Simple Mail Transfer Protocol) servers (e.g., SMTP servers 15 and 20, Message Transfer Agents (MTA) 30 and 25) before reaching its final destination (e.g., a receiver 25). An action of each MTA is defined as a "store and forward" mechanism which means that each message is temporarily stored and then forwarded when the MTA has an appropriate communication channel available.

A mail client (e.g., Outlook Express® from Microsoft®, GroupWise® from Novell®, Lotus® Note from IBM®) has a Graphical User Interface (GUI) to use a Messaging service (e.g., email or instant messaging). This GUI is interfaced with two main software stacks (a software stack refers to a set of programs that cooperatively interact together to produce a result):

A software stack enables users to submit an email message in Simple Mail Transfer Protocol (SMTP) to an MTA (e.g., SMTP servers 15 and 20, MTA 30 and 35) using an Internet Message Format (e.g., RFC2821) and, Another software stack enables users to access to the message stored in a user's mailbox.

This GUI may further include a directory interface, i.e., an interface to enable to access to an enterprise directory or to an address book.

The SMTP protocol establishes a connection between MTAs (e.g., SMTP servers 15 and 20, MTA 30 and 35) to submit a message for recipients. Information exchanged during this connection are called envelop information and could be stored in a log file or during the store and forward mechanism. In a connection under the SMTP protocol, one message could be submitted for several recipients. A connection under the SMTP protocol is established with a MTA (e.g., a SMTP server 15 or 20, MTA 30 or 35) for a specific Domain Name. The SMTP protocol further describes a queuing method for congestion.

An MTA (e.g., a SMTP server 15 or 20, MTA 30 or 35) does not modify a message. However, the MTA puts information in a message header to trace a path of the message. When an MTA (e.g., a SMTP server 20 or MTA 30) accepts a message either for relaying or for a final delivery (i.e., a delivery to a recipient), the MTA inserts a time stamp line at the beginning of a message header. The time stamp line indicates an identity of a computing device that sent the message, and an identity of a computing device that received the message (and is inserting this time stamp), and a date and time the message was received. Relayed messages will have multiple time stamp lines like following: Return-Path: <@GHI.ARPA,@DEF.ARPA,@ABC.ARPA:
JOE@ABC.ARPA>
Received: from GHI.ARPA by JKL.ARPA; 27 October 81 15:27:39 PST
Received: from DEF.ARPA by GHI.ARPA; 27 October 8115:15:13 PST
Received: from ABC.ARPA by DEF.ARPA; 27 October 81 15:01:59 PST
Date: 27 October 81 15:01:01 PST The SMTP protocol manages the envelop information and the message header in the message. Under the SMTP protocol, a message format is included in the envelop information or the message header. The MTA via the SMTP protocol is not aware about the envelop information and/or the message header inside the message.

When a message is received and stored in a mailbox of a recipient by the MTA, there are several possibilities for users to access the Mail:

An User Agent (UA) (e.g., Outlook Express® from Microsoft®; i.e., a mail client) can read directly the message in the mailbox.

The UA can have access to the mailbox via a server under a POP3 or like protocol which provides message retrieval commands on a mail server. The mail server is called Message Store (MS) (not shown) and must have an access to the mailbox. All email messages are retrieved on the UA.

The UA can have an access under IMAP4 (Internet Message Access Protocol 4) via the Message Store. The IMAP4 is more sophisticated than the POP3 protocol. For example, under the IMAP4, email messages can be stored on the Message Store. A user can create folders on the Message Store to classify the email messages. The IMAP4 provides a remote management of the mailbox.

However, in the traditional messaging system (e.g., FIG. 1), it is difficult for a user to identify a purpose of an email message or to have all background information about an email message. Furthermore, in the traditional messaging system, it is difficult to obtain instantly or immediately more details or information about a received email message.

Therefore, it would be desirable to provide a method or system for communicating via an avatar embedded in an email message to immediately obtain more details or information associated with the received email message.

SUMMARY OF THE INVENTION

The present invention describes a system and method communicating via an avatar embedded in an email message to obtain more details or information associated with the email message.

In one embodiment, there is provided an email messaging system for communicating via an avatar, the system comprising:

a first client device for sending an email having an embedded avatar representing a sender;

a second client device for receiving the email from the first client device and enabling a receiver to submit a query via the avatar in the received email; and a remote server device for communicating with the second client device via a communication protocol, receiving the query from the second client device, parsing and analyzing the query, retrieving a corresponding answer from the sender's mailbox including emails associated with the parsed and analyzed query, and providing the corresponding answer to the second client device via the avatar.

In one embodiment, there is provided a method for communicating via an avatar, the method comprising:

sending an email having an embedded avatar representing a sender;

receiving the email and enabling a receiver to submit a query via the avatar in the received email; and receiving the query via a communication protocol, parsing and analyzing the query, retrieving a corresponding answer from the sender's mailbox including emails associated with the parsed and analyzed query, and providing the corresponding answer via the avatar.

In a further embodiment, the corresponding answer is retrieved from one or more of: an agenda, a folder, a previous answer, a calendar, a resume, and an expert system with an artificial intelligence.

In a further embodiment, the communication protocol is one or more of: SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, and like messaging protocols.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

One embodiment of the present invention implements an avatar remote server device (e.g., an avatar remote server device 100 in FIG. 2) to enable a user to submit a question directly and instantly to a sender of an email message. If the sender of the email message is not online, the avatar remote server device retrieves a corresponding answer from a mailbox of the sender. The question may be provided to the sender or the avatar remote server device in a text, audio or speech format.

Figure 4:
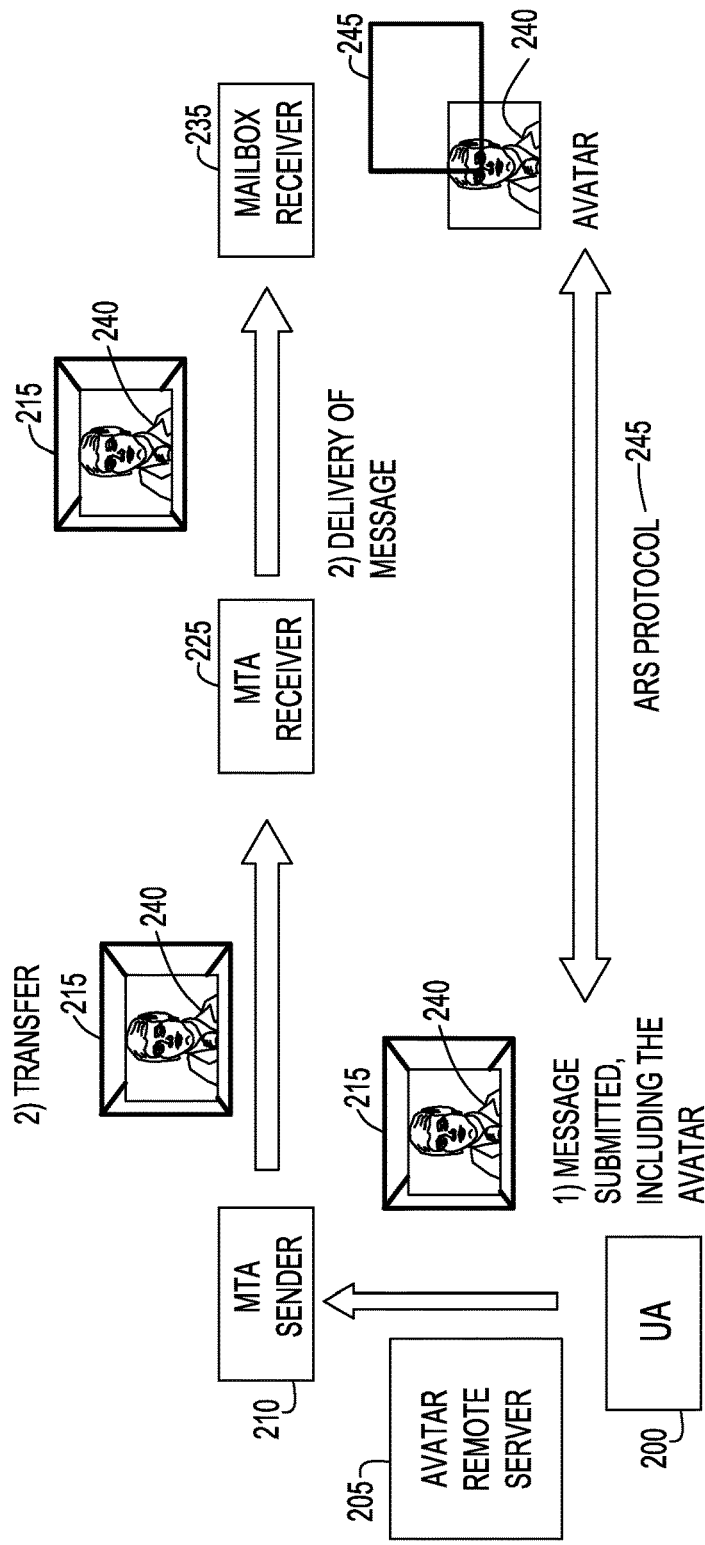
FIG. 4 illustrates a flow chart including method steps employed according to one embodiment of the present invention.

FIG. 4 illustrates a flow chart describing method steps executed according to one embodiment of the present invention. At step 1, a sender using a first client device 200, which includes a UA, sends an email 215 including an avatar 240 to a receiver. The avatar 240 is a graphical application or plug-in representing the sender. In one embodiment, the UA embed the avatar 240 in the email 215 by implementing a plug-in or API (Application Programming Interface) in the email 215. In another embodiment, the UA attaches the avatar 240 in the email 215 as a graphic file, which can invoke a pop-up window 245 upon clicking. The avatar 240 may be an animated moving image or static image, through which a communication between a receiver of the email 215 and the avatar remote server device 205 can be established under a communication protocol, which is described later. The first client device 200 including the UA may be a personal computer, desktop computer, laptop computer, or a workstation. After sending the email 215 from the first client device 200, a MTA sender 210 receives the email 215. The MTA sender 210 is a messaging server forwarding the email 210 from the first client device 200 to a MTA receiver 225. A messaging server is a middleware application that handles messages that are sent for other applications using an application program interface (API). The messaging server usually queue and prioritize messages as needed and has applications to perform the queuing and prioritizing. The messaging server usually operates according to point-to-point messaging or publish/subscribe messaging. The point-to-point messaging is a queue-based mechanism. In the point-to-point messaging, messages are addressed to a specific queue. Senders send messages to a queue and receivers obtain messages from the queue. The publish/subscribe messaging is an asynchronous messaging paradigm where senders are not programmed to send their messages to specific receivers. Rather, sent messages are characterized based on topics without knowledge of receivers. Receivers express an interest in one or more topics and receive messages that are of interest without knowledge of senders.

In one embodiment, when the sender creates the email 215 by using the UA in the first client device, the UA in the first client device also creates a message-identification (MSG-ID) to uniquely identify the email 215 and the receiver (email's final destination). The UA may create the MSG-ID of the email 215 based on a date and time at which the email 215 is created. For example, if the email 215 is created at 10:20:30 AM on Jul. 10, 2008, the MSG-ID of the UA may be XXXX10203007102008, where XXXX represents a random number that can be generated by a random number generator (e.g., ComScire® PCQNG True Random Number Generator (TRNG)). In a further embodiment, after sending the email 215 from the first client device 200, the email 215 passes through the avatar remote server device 205, where the MSG-ID is stored in a profile database (e.g., a profile database 155 in FIG. 2).

At step 2, the MTA sender 210 transfers the email 215 to a MTA receiver 225. The MTA receiver 225 is another messaging server which delivers the email 215 to a mailbox of the receiver, e.g., via a message store (not shown) which stores the email 215 permanently or temporarily. At step 3, the MTA receiver 225 delivers the email 215 to the receiver. In one embodiment, the receiver operates a second device 235 including a UA to access a mailbox of the receiver. The second device 235 may be a personal computer, desktop computer, laptop computer, or workstation. After receiving the email 215, if the receiver wants to ask a query related to the email 215, then the receiver may send the query to the avatar remote server device 205 under an ARS (Avatar Remote Server) communication protocol 245. The ARS communication protocol 245 includes, but is not limited to, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol and like messaging protocols. In one embodiment, to send a query to the avatar remote server device 205, the receiver clicks the avatar 240 in the email 215. Then, a pop-up window 245 appears on the second client device 235. The receiver can type the query in the pop-up window and submit the query to the avatar remote server device by pushing "send" button (not shown). In one embodiment, if the second client device supports a microphone capability, the receiver can ask the query in audio format. For example, after clicking the avatar, a pop-up window 245 may appear on the second client device 235 to indicate to record the query in audio format. After recording the query, the receiver may push "complete and send" button (not shown) to stop the recording and to send the recorded query.

The avatar remote server device 205 communicating with the second client device 235 via the communication protocol 245 parses and analyzes the query, after receiving the query from the second client device 235 via the avatar 240. Hafiz et al., "Modular and Efficient Top-Down Parsing for Ambiguous Left-Recursive Grammars", Proceedings of the 10$^{th}$ Conference on Parsing Technologies, June 2007, hereinafter "Hafiz", wholly incorporated as a reference as set forth herein, describes building a parser. To analyze the query, MySQL Query Analyzer and Java Query Analyzer may be utilized. MySQL Query Analyzer and Java Query Analyzer are freeware and can be obtained in Internet. For example, http://www.download3000.com/download_19469.html provides a download link of MySQL Query Analyzer.

After parsing and analyzing the query, the avatar remote server device 205 access a mailbox of the sender. The mailbox of the sender may include a plurality of emails. Among the plurality of emails, the avatar remote server device retrieves an answer (i.e., emails, documents and/or information answering the query) corresponding to the query. To retrieve the answer, the avatar remote server device 205 may employ a well-known search algorithm such as depth-first search (DFS) or breath-first search (BFS). For example, if the query is "provide emails between the sender and Mr. Lee between Oct. 10, 2007 and Nov. 10, 2007", the avatar remote server device 205 access one or more mailboxes of the sender and then retrieve emails from "Mr. Lee" or emails to "Mr. Lee" between Oct. 10, 2007 and Nov. 10, 2007 by utilizing a well-known search algorithm. In one embodiment, the avatar remote server device 205 may provide the parsed and analyzed query to the UA in the first client device 200. Then, the UA (e.g., Microsoft® Outlook®, Novell® GroupWise®, IBM® Lotus® Note) may retrieve a corresponding email, document or information from the mailbox(s) of the sender based on its built-in search feature (e.g., ctrl-F). Then, the UA provides the corresponding email, document or information to the avatar remote server device 205. After obtaining the answer, the avatar remote server device 205 provides the answer to the second client device 235 via an avatar. For example, the avatar 240 may show the answer on a display of the second client device 235. Thus, the receiver does not need to wait an hour or a day to obtain the answer, e.g., by sending another email to the sender. The avatar remote server device 205 provides the answer to the receiver within a couple of minutes, after receiving the query from the receiver.

In a further embodiment, the avatar remote server device may retrieve the answer (e.g., emails, document, or information answering the query) from the mailbox(s) of the sender based on a relevance to the parsed and analyzed query.

In a further embodiment, the avatar remote server device 205 provides the answer by an email to the receiver. At the same time, the avatar remote server device 205 may send a notice to the receiver via the avatar 240. For example, a pop-up window 245 invoked from the avatar 240 may show that the avatar remote server device 205 just sent an email including the answer to the receiver.

In a further embodiment, the avatar remote server device 205 accesses an agenda associated with the parsed and analyzed query, a folder associated with the parsed and analyzed query, a previous answer associated with the parsed and analyzed query, a calendar associated with the parsed and analyzed query, a resume associated with the parsed and analyzed query, an address book associated with the parsed and analyzed query and an expert system with an artificial intelligence associated with the parsed and analyzed query to retrieve the answer (e.g., emails, documents, information answering the parsed and analyzed query).

In a further embodiment, the MSG-ID stored in the profile database (e.g., a profile database 155 in FIG. 2) correlates the email 215 and the query provided from the receiver, when the avatar remote server device receives the query. For example, when receiving the query from the receiver, the avatar remote server device 205 checks whether the query passes through a correct avatar corresponding to the MSG-ID. If the query passes through the correct avatar, the avatar remote server device 205 processes the query by parsing and analyzing the query. Otherwise, the avatar remote server device 205 ignores the query. Alternatively, the avatar remote server device 205 sends a notice to the receiver to indicate that the query is invalid because it came from an avatar which does not correspond to the MSG-ID of the email 215. For a security purpose, the profile database may store the MSG-ID encrypted with an encryption/description algorithm (e.g., DES (Data Encryption Standard)). When the receiver sending the query, the query may also include an encrypted email address of the receiver. By sharing a public key (i.e., an encryption key) and using a same encryption/decryption algorithm between the receiver and the avatar remote server device 205, the encrypted email address of the receiver can be decrypted in the avatar remote server device 205.

In a further embodiment, after receiving the query from the receiver via an avatar 240 in the email 215, the avatar remote server device 205 sends a notification indicating the query to the sender based on a rule. The rule may be based on a decision table like following:

TABLE 1

| Decision Table | | | |
|---|---|---|---|
| | | Rule 1 | Rule 2 |
| Conditions | Access to Mailbox | Y | Y |
| | Access to Agenda | Y | Y |
| | Access to Resume | N | N |
| | Access to User Profile | Y | N |

TABLE 1-continued

Decision Table

|  |  | Rule 1 | Rule 2 |
|---|---|---|---|
| Actions | Voice Question | Y | Y |
|  | Internet Email | Y | N |
|  | Direct Contact | Y | N |
|  | Search Text | Y | Y |
|  | Speech to text | Y | N |

The decision table describes each rule. For example, a rule 1 allows the avatar remote server device 205 to access a mailbox, agenda, user profile (e.g., a record including a date of birth) and email to obtain the answer corresponding to the query. However, the rule 1 does not allow the avatar remote server device 205 to access a resume to obtain the answer corresponding to the query. The rule 1 allows the avatar remote server device 205 to accept the query in audio format (i.e., "Voice Questions" is Y). The rule 1 allows the avatar remote server device 205 contacts the sender to ask the query from the receiver. For example, if the avatar remote server device 205 sends the notification to sender and the sender has an online connectivity (i.e., has an Internet connection), then the sender may able to provide the answer, e.g., by typing on the first client device 200. Then, the typed answer may appear on a display of the second client device 235 via the avatar 240. However, the receiver does not know that the answer comes from the sender, because the answer appears same via the avatar 240 regardless of where the answer is provided from (e.g., from the avatar remote server device 205 or from the sender). Though the table 1 includes two rules, the decision table can describe a plurality of rules. The decision table may further describe services or actions of the avatar remote server device 205. For example, the rule 1 describes the avatar remote server device 205 performs a text search in the mailbox, agenda, resume, user profile and email to retrieve or obtain the answer. The rule 1 further describes whether the avatar remote server device 205 supports a speech-to-text transformation. Thus, the avatar remote server device 205 may include a speech-to-text transformation capability. Englund, "Speech recognition in the JAS 39 Gripen aircraft-adaptation to speech at different G-loads", Mar. 11, 2004, wholly incorporated as a reference as set forth herein, hereinafter "Englund", describes a speech recognition technology. One of ordinary skill in the art is able to implement the speech-to-text transformation capability in the avatar remote server device 205 based on the contents of Englund. In a further embodiment, the decision table may be a stored in a database (e.g., expert system 135 in FIG. 2)

In one embodiment, the avatar remote server device 205 receives the query in an audio format from the receiver, performs a speech-to-text transformation on the audio query, parses and analyzes the transformed query, retrieves a corresponding answer (e.g., emails or documents) from a database associated with the parsed and analyzed query, and provides the corresponding answer in a text or in an audio format to receiver via the avatar 240. The database associated with the parsed and analyzed query includes, but is not limited to, a mailbox, a folder, an address book, a previous answer, a toDoList, an expert system, and a resume.

In an exemplary use scenario, a first user receives an email message from a second user's computing device, which is also sent to a third user. Then, the first user would like to have a previous message exchange by the second user and the third user. So, the first user clicks an avatar embedded in the message to request the previous message. This request is sent to mailboxes of the third user. Previous emails between the second user and the third user are provided from the mailboxes of the third user to the first user via email(s). In a security aspect, the third user may allow only a specific mailbox to be shared. Other mailboxes of the third user may not be allowed to be searched to find a previous message between the second user and the third user. In a further embodiment, the avatar remote server device may implement a security mechanism such as authentication (e.g., validating whether the first user can read an email message of the second user based on a preference setting of the second user's mailbox) and non-repudiation (e.g., the first user should have a key to open or read the previous message). In a further embodiment, the avatar remote server device accesses a personal information management, agenda, to do list (i.e., a list including items that have to be done), an address book of the third user to retrieve more information of the previous message(s). The personal information management refers to both a practice and a study of activities people perform in order to acquire, organize, maintain, retrieve and use documents, web pages and email messages for everyday use to complete tasks and fulfill a person's various roles (as parent, employee, friend, member of a community, etc.).

In one embodiment, the avatar remote server device (e.g., the avatar remote server device 205 in FIG. 4 or an avatar remote server device 100 in FIGS. 2-3) accesses a mailbox of a user using a cryptographic protocol, e.g., Transport Layer Security (TLS). The TLS is a protocol providing a security and data integrity for communications over TCP/IP networks such as Internet. The mailbox of the user may be maintained in the user's computing device and/or a mail server (e.g., SMTP 20) under one of the communication protocols described above. The avatar remote server device receives a request from a user (e.g., the request to provide the previous email between the second user and the third user), maintains a security aspect (e.g., the avatar remote server device does not access a mailbox of a user, which the user does not want to share) and provide an answer of the request (e.g., by retrieving the previous email from a mailbox of the third user). In one embodiment, the avatar remote server device informs an owner of a mailbox before accessing the mailbox. Then, if the owner of the mailbox is online and can provide the answer of the request immediately, the owner provides the answer immediately. However, a requester who sent the request to the avatar remote server device may not know whether the answer is provided from the avatar remote server device or from the owner, because the answer is provided via the avatar representing the owner regardless of whether the avatar remote server device provides the answer or whether the owner provides the answer.

When an owner of a mailbox provides the answer directly, the avatar remote server device can reuse the answer and save the answer for a future purpose, because a lot of people may ask a same question. For example, assume that a user sent an email to everybody in the user's organization to ask to attend a meeting without specifying the meeting's location and the meeting's time. Then, for the meeting, everybody may ask where the meeting is and what time the meeting starts. The avatar remote server device can provide an answer automatically, if the owner of the mailbox already provided the answer or the avatar remote server device accessed the user's agenda. When a user installs the avatar remote server device, the user (e.g., an owner of a mailbox) can specify who can access mailboxes of the user, which mailboxes can be accessed by the other users, whether agendas, resumes, toDoLists, folders, previous answers, and expert systems with artificial intelligences associated with the user can be accessed or not. An expert system is software that attempts to reproduce a performance of one or more human experts in a specific problem domain. In one embodiment, a user agent (UA), e.g., Outlook® from Microsoft® or GroupWise® from Novell®, maintains an agenda, toDoList, address book, calendar, and a mail folder. Upon receiving a question, the avatar remote server device may access the UA to retrieve an answer of the question from a mailbox, a mail folder, an agenda, an address book, a calendar, or a toDoList. The user of the avatar remote server device can also specify which services the avatar remote server device can provide. For example, as described above, the avatar remote server device can provide an answer of a question automatically to users without contacting the user by retrieving the answer from a mailbox, a mail folder, an agenda, an address book, a calendar, and/or a toDoList of the user.

In one embodiment, a sender sends an email including an avatar. A receiver of the email can immediately ask a query related to the email via the avatar, e.g., by clicking the avatar to invoke a pop-up window, typing a query on the pop-up window and submitting the query to the avatar remote server device by pushing "send" button on the pop-up window. Then, the receiver submits the query to the avatar remote server device. Thus, the avatar allows the receiver to interact with the avatar remote server device via a communication protocol, e.g., SMTP (Simple Mail Transfer Protocol). The avatar remote server device installed in a computing device of the sender, which includes a user agent (UA), e.g., Outlook® from Microsoft®, may communicate with the UA to provide answers or services to the receiver who asked the query via an avatar. In another embodiment, the avatar remote server device is installed in an MTA (Message Transfer Agent). Upon receiving a query from a user, the avatar remote server device installed in the MTA parses and analyzes the query and accesses a mailbox, agenda, calendar, or folder associated with the parsed and analyzed query. The mailbox, agenda, calendar, or folder may belong to anyone other than the user who asked the query. Alternatively, the mailbox, agenda, calendar or folder may belong to the user who asked the query. Then, the avatar remote server device retrieves a mail or a document associated with the parsed and analyzed query from the mailbox, agenda, calendar, or folder of the user or another user. The avatar remote server device sends the retrieved mail or document to the receiver. The retrieved mail or document may appear on a screen of a client device that the receiver uses via the avatar.

Figure 1:
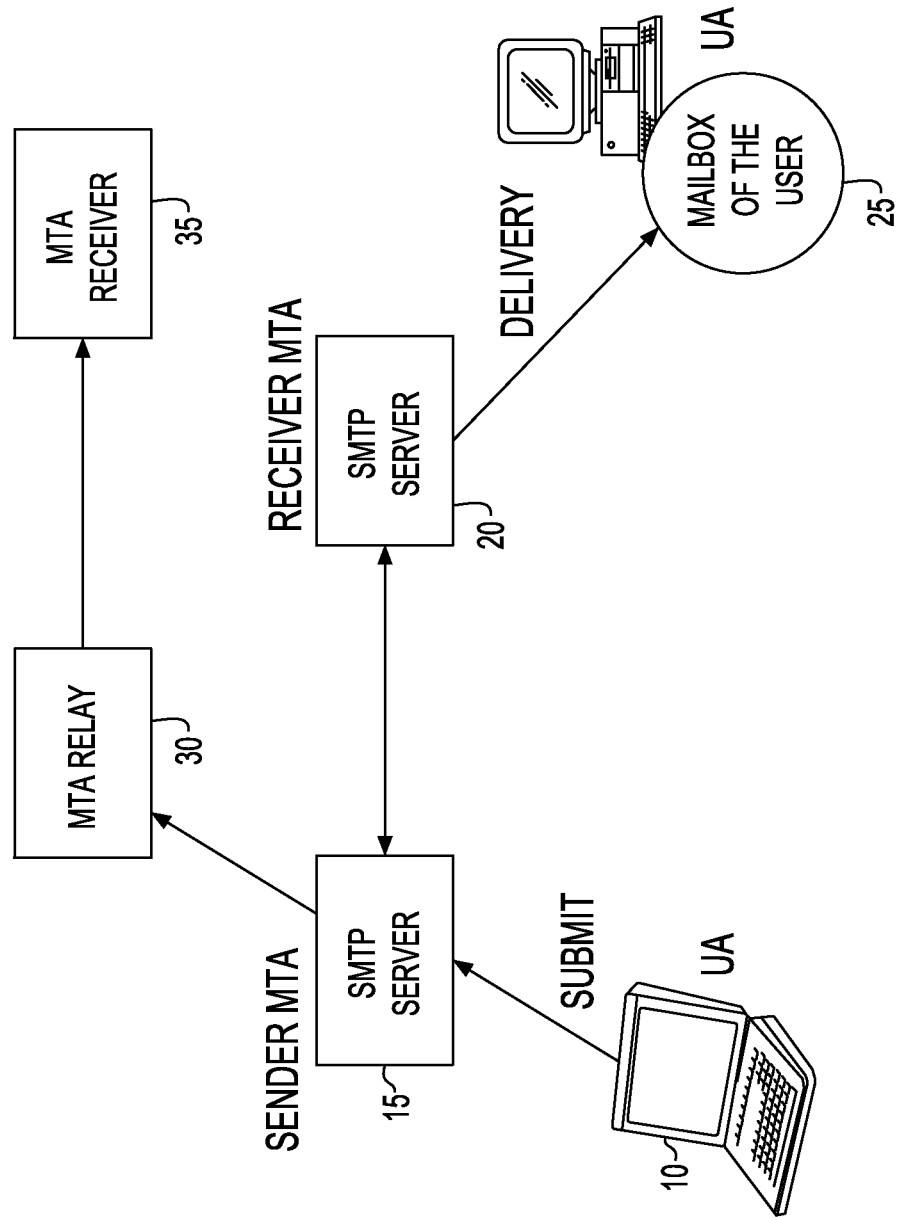
FIG. 1 illustrates a traditional messaging system.
Figure 2:
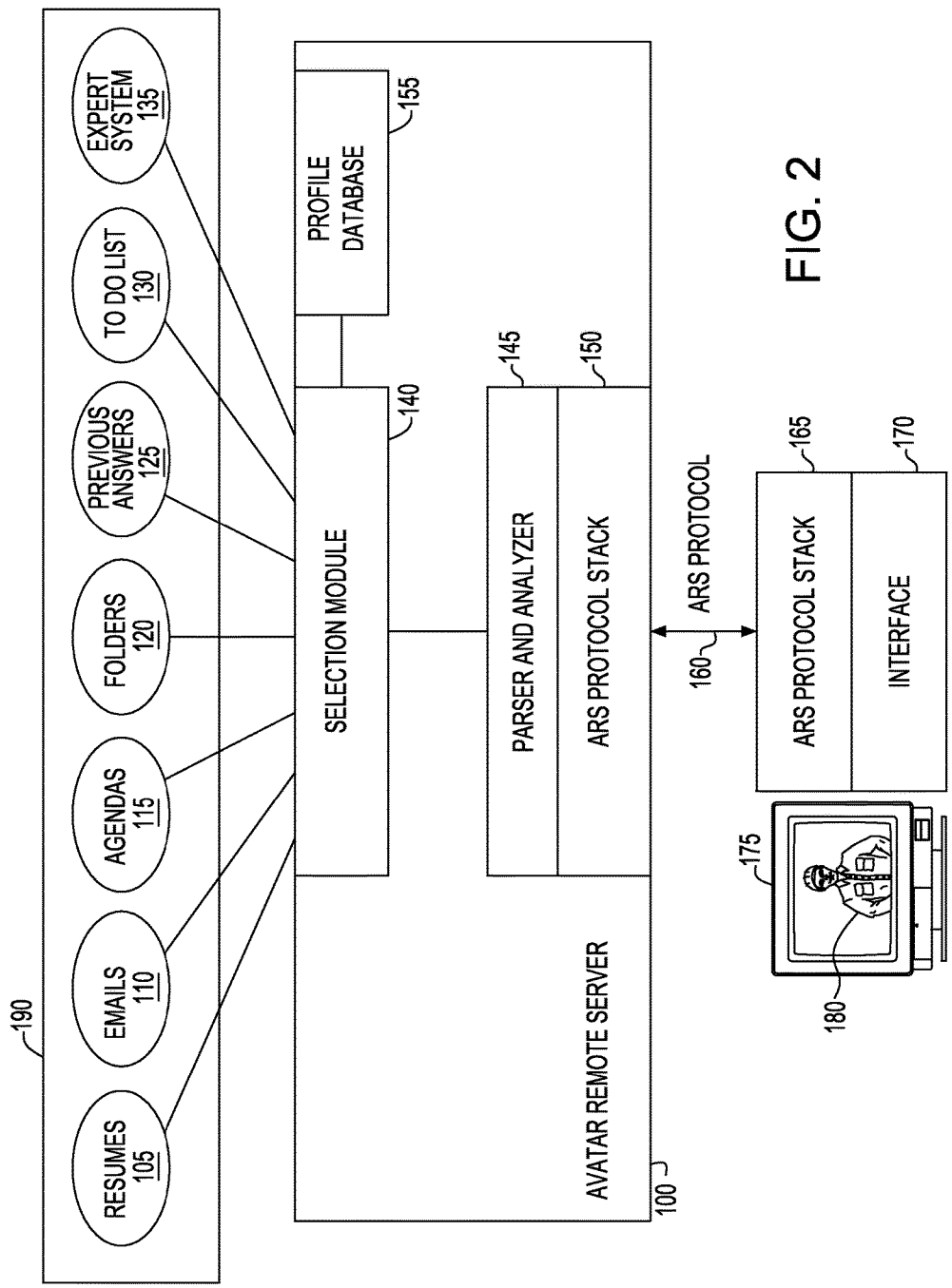
FIG. 2 illustrates a system diagram according to one embodiment of the present invention.

FIG. 2 illustrates a system diagram according to one embodiment of the present invention. The avatar remote server device 100 in FIG. 2 corresponding to the avatar remote server device 205 in FIG. 4 includes, but is not limited to, a selection module 140, a parser and analyzer 145, a ARS (Avatar Remote Server) protocol stack 150 and a profile database 155. A client device 175 includes, but is not limited to, an ARS protocol stack 165 and an interface 170. The avatar remote server device 100 and the client device 175 communicate each other via an ARS communication protocol 160, which is described above. The ARS protocol stack 150 in the avatar remote server device 205 and the ARS protocol stack 165 in the client device 175 are a set of programs enabling a communication between the avatar remote server device 205 and the client device 175 under the ARS communication protocol 160. The parser and analyzer 145 may include a parser implemented based on Hafiz and a query analyzer such as MySQL query analyzer or Java query analyzer. Upon receiving a query from the client device 175, the ARS protocol stack 150 forwards to query to the parser and analyzer 145. Then, the parser and analyzer 145 perform parsing and analyzing the query and then provide the parsed and analyzed query to a selection module 140. The selection module accesses a database 190 that includes, but is not limited to, resumes 105, emails 110, agendas 115, folders 120, previous answers 125, toDoLists 130, and expert systems. Then, the selection module 140 provides the parsed and analyzed query to the database and retrieves an answer (e.g., a table, document, email, etc., answering the query) from the database. Subsequently, the selection module 140 provides the answer to the client device 175 via the ARS protocol stack 150. Upon receiving the answer, the client device 175 displays the answer via an avatar 180, which corresponds to the avatar 240 in FIG. 4. The interface 170 in the client device 175 may be an Application Programming Interface (API) enabling the avatar and/or a Graphical User Interface (GUI) assisting a user to create the query such as via a pop-up menu (not shown). The profile database 155 in the avatar remote server device 205 stores the MSG-ID(s) and a list of receivers and senders corresponding to each MSG-ID. The profile database 155 may also store an access right of each user. The access right of a user may specify whether the user can access all the data in the database of all other users, whether the user can access only specific data (e.g., only mailboxes and address books) of a specific user, when the user can access the database, etc.

In a further embodiment, the database 190 may be configured to allow limited access to specific data. For example, the avatar remote server device 205 may allow a group of users to access a folder 120, but may not allow to access a mailbox 110 including emails. The avatar remote server device 205 may allow a group of users only access to a folder named "Group". The avatar remote server device 205 may allow a specific user only access to a folder named "Bid" and emails from a specific domain (e.g., @ibm.com). Thus, the avatar remote server device 205 can retrieve the answer by accessing only allowed or authorized data. Alternatively, the avatar remote server device 205 can retrieve the answer by accessing all data (e.g., resumes 105-expert systems 135) in the database 190, if an owner of the database 190 allows to share all the data with other users.

Figure 3:
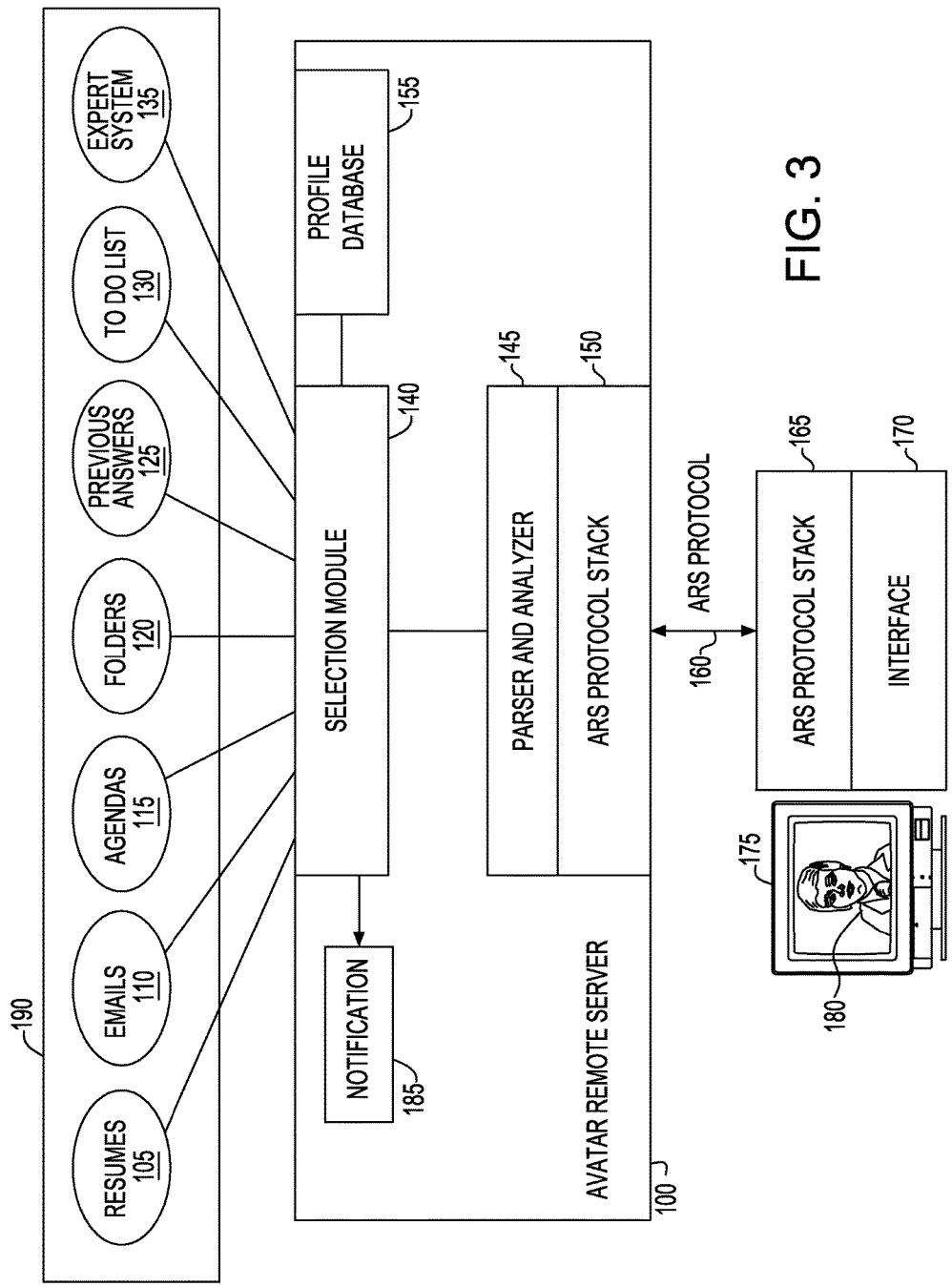
FIG. 3 illustrates a system diagram according to a further embodiment of the present invention.

FIG. 3 illustrates another system diagram according to one embodiment of the present invention. All components operate same as described above according to FIG. 2 except that, upon receiving a query from the client device 175, the selection module 140 sends a notification 185 to an owner of the database 190, who may be the sender of the email 215 in FIG. 4. Then, the owner of the database 190 provides the answer directly, if the owner is connected to Internet. In a further embodiment, the answer is recorded in the database 190 (e.g., the previous answers 125) and can be used for other users who asking a similar or same query. If the owner does not provide an answer within a certain time after sending the notification 285, e.g., 10 minutes, the selection module 140 accesses the database 190 to retrieve the answer. Then, the selection module 140 provides the answer to the client device 175.

In a further embodiment, the avatar 180 comprises an interface 170 including a text pop-up window to provide a text question. The avatar 180 may be a 2D (two-Dimensional) or 3D (three-Dimensional) image where the avatar represents the owner of the database 190. According capabilities of the client device 175 and plug-ins, the interface 170 collects the query which is then translated in a right grammar and sent via the ARS protocol stack 165 in another message. The query may be an audio file recorded by the Interface 170. If the query is the audio file, a speech to text transformation is used at the ARS protocol stack 165 to covert the query into a text. The selection module 140 may access an expert system 135 which is composed of rules (e.g., table 1) to generate actions and access all other databases such as resumes 105-ToDoList 130.

In one embodiment, an owner of the database 190 sends a message including the avatar 180 to a receiver. The ARS protocol stack 165 in the client device 175 and the ARS protocol stack 150 in the avatar remote server device 100 maintains compatibility and consistency between the avatar remote server device 100 and the avatar 180 by utilizing a same communication protocol. The implementation of the avatar remote server device 100 and the avatar 180 does not require any modification of a UA (e.g., IBM® Lotus® Note) to support functions of the avatar remote server device 100 and the avatar 180.

In a further embodiment, the avatar remote server device 100 is implemented as hardware on a reconfigurable hardware, e.g., FPGA (Field Programmable Gate Array) or CPLD (Complex Programmable Logic Device, using a hardware description language (Verilog, VHDL, Handel-C, or System C). In another embodiment, the avatar remote server device 100 is implemented on a semiconductor chip, e.g., ASIC (Application-Specific Integrated Circuit), using a semi custom design methodology, i.e., designing a chip using standard cells and a hardware description language.

In a further embodiment, the avatar remote server device 100 is implemented as software using one or more programming languages, e.g., C, C++, Java, .NET, Perl, Python, etc. In one embodiment, the avatar remote server device 100 is recorded in a computer readable medium, e.g., CD (Compact Disc), DVD (Digital Versatile Disc), HDD (Hard Disk Drive), as an instruction, e.g., a machine language or assembly language, that is executed by a processor, e.g., Intel® Core®, IBM® Power PC®, AMD® Opteron®.

In a further embodiment, the avatar remote server device 100 is implemented as hardware through a computing device, e.g., a desktop, a laptop, a mainframe, a workstation, etc., by being executed in the computing device. The computing device comprises, but not limited to include, processor(s), memory(s), display device(s), input/output device(s) and network interface(s).

The avatar 180 may be implemented by a plug-in or API. A standard anti-spamming system, e.g., Symantec® Norton™ AntiSpam™, can be added in the client device 175 or the avatar remote server device 100 to prevent spam mails.

Following is another exemplary usage scenario of the present invention.

(1) A sender (first_user_sender@ibm.com) of an email wants to send his avatar in an email, so at the end of the email the sender embeds or attaches his/her avatar. A MSG-ID associated with the email is stored in a database along with the email and receiver's information. A protocol used between the receiver and the avatar remote server device is SIP (Session Initiation Protocol). The email sent by the sender may be like following:

Subject: Patent US201
TO: second_user_receiver@ibm.com
From: first_user_sender@ibm.com
Copy: third_user_copy@atty.com; fourth_user_copy@atty.com
Text:
 Patent related to IBM ® WebSphere ® Application Server (2) The sender embeds or attaches the avatar in the email and sends the email to the receiver.
(3) A MTA in charge delivers the email to a mailbox of the receiver.
(4) When the receiver opens the email, the receiver clicks the avatar included in the email.
(5) The avatar contacts an ARS protocol stack of a client device to establish a connection with the Avatar remote server device of the sender.
(6) The avatar remote server device receives a connection request from the avatar. An ARS stack protocol of the avatar remote server device parses the connection request and retrieves a MSG-ID associated with the email from which the connection request is made.
(7) A session established by the connection becomes secure using the MSG-ID created by a UA of the sender. (A validity of the session is verified by matching the MSG-ID and the avatar which invokes the session.)
(8) Based on the retrieved MSG-ID, the avatar remote server device identifies the email and the receiver of the email.
(9) The avatar remote server device obtains an access right of the receiver from the profile database, i.e., whether the receiver (seond_user_ibm@ibm.com) can access all data in a database associated with the sender.
(10) The receiver has a question about the email that the receiver received from the sender. Thus, the receiver sends a question to the avatar remote server device via a pop-up window appeared by clicking the avatar. The question is "do have you other messages including "patent US201" in a subject?".
(11) The avatar remote server device receives the question through the SIP protocol.
(12) The ARS protocol stack of the avatar remote server device opens the question and sends the question to a parser and analyzer in the avatar remote server device.
(13) The parser and analyzer in the avatar remote server device identify the question and issue a search request for emails whose subject includes "patent US201".
(14) The selection module in the avatar remote server device performs the search request in the sender's mailbox(s).
(15) The selection module found 3 emails including "patent US201" in the subject.
(16) The avatar remote server device sends the 3 emails to the receiver under the SIP protocol. The, the 3 emails appear, via the avatar, on the screen of the client device that the receiver is operating.
(17) The receiver has a question related to one of the 3 emails. The receiver sends the question via the avatar. The question is "Who is "third_user_copy""?
(18) The avatar remote server device receives the question.
(19) The parser and analyzer in the avatar remote server device issue a search request to look for the third_user_copy.
(19) The selection module searches the third_user_copy in the mailbox of the sender and in the address book of the sender.
(20) The selection module finds an entry of the third_user_copy in the address book with all information describing the third_user_copy.
(21) The avatar remote server device sends all the information of the third_user_copy to the receiver.
(22) The receiver read all the information of the third_user_copy appeared, via the avatar, on the screen of the client device that the receiver is operating.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in computer systems—are able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may include a method of deploying a computer program product including a program of instructions in a computer readable medium (e.g., a compact disc (CD, a digital versatile disc (DVD), a hard disk drive, a solid state drive, etc.) for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A system comprising:
a processor; and
memory coupled to the processor and storing instructions that, when executed by the processor, cause the system to perform operations comprising:
receiving, from a sender at a first computing device, an email directed to a recipient at a second computing device, wherein the email includes an embedded avatar;
responsive to the recipient at the second computing device selecting the embedded avatar, providing an interface through which the recipient interacts to submit a query via the avatar;
receiving the query via a communication protocol;
parsing and analyzing the received query:
retrieving an answer corresponding to the parsed and analyzed query from a mailbox of the sender, wherein the mailbox of the sender includes emails associated with the parsed and analyzed query;
sending the answer to the second computing device; and
initiating display of the answer via the avatar on the second computing device.

2. The system of claim 1, wherein the embedded avatar represents the sender.

3. The system of claim 1, wherein the corresponding answer is retrieved from one or more of: an agenda, a folder, a previous answer, a calendar, a resume, and an expert system with artificial intelligence.

4. The system of claim 1, wherein the memory further stores instructions for causing the system to perform operations comprising: sending a notification indicating the query to the sender based on a rule.

5. The system of claim 1, wherein sending the answer to the second computing device further comprises:
identifying that the sender has an online connection; and
relaying the corresponding answer from the first computing device to the second computing device, wherein the answer appears on a display of the second computing device.

6. The system of claim 1, wherein the memory further stores instructions for causing the system to perform operations comprising:
receiving the query in an audio format;
performing a speech-to-text transformation on the audio query; and
providing the corresponding answer in an audio format via the avatar.

7. The system of claim 1, wherein the communication protocol is one or more of: SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, and Azureus Extended Messaging Protocol.

8. The system of claim 1, wherein the memory further stores instructions for causing the system to perform operations comprising: storing one or more message-identifications (MSG-IDs), the one or more MSG-IDs uniquely identifying each message created by the sender.

9. A computer-implemented method comprising:
- receiving, by a computer system from a sender at a first computing device, an email directed to a recipient at a second computing device, wherein the email includes an embedded avatar;
- responsive to the recipient at the second computing device selecting the embedded avatar, providing, by the computer system, an interface through which the recipient interacts to submit a query via the avatar;
- receiving, by the computer system, the query via a communication protocol;
- parsing and analyzing the received query by the computer system;
- retrieving, by the computer system an answer corresponding to the parsed and analyzed query from a mailbox of the sender, wherein the mailbox of the sender includes emails associated with the parsed and analyzed query:
- sending, by the computer system, the answer to the second computing device; and
- initiating, by the computer system, display of the answer via the avatar on the second computing device.

10. The method of claim 9, wherein the embedded avatar represents the sender.

11. The method of claim 9, wherein the corresponding answer is retrieved from one or more of: an agenda, a folder, a previous answer, a calendar, a resume, and an expert system with artificial intelligence.

12. The method of claim 9, further comprising: sending, by the computer system, a notification indicating the query to the sender based on a rule.

13. The method of claim 9, wherein sending the answer to the second computing device further comprises:
- identifying that the sender has an online connection; and
- relaying the corresponding answer from the first computing device to the second computing device, wherein the answer appears on a display of the second computing device.

14. The method of claim 9, further comprising:
- receiving, by the computer system, the query in an audio format:
- performing, by the computer system, a speech-to-text transformation on the audio query; and
- providing, by the computer system, the corresponding answer in an audio format via the avatar.

15. The method of claim 9, wherein the communication protocol is one or more of: SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol and Azureus Extended Messaging Protocol.

16. The method of claim 9, wherein the memory further stores instructions for causing the system to perform operations comprising: storing one or more message-identifications (MSG-IDs), the one or more MSG-IDs uniquely identifying each message created by the sender.

17. A non-transitory computer-readable medium storing instructions that, when executed by a computer system, cause the computer system to perform operations comprising:
- receiving, from a sender at a first computing device, an email directed to a recipient at a second computing device, wherein the email includes an embedded avatar:
- responsive to the recipient at the second computing device selecting the embedded avatar, providing an interface through which the recipient interacts to submit a query via the avatar:
- receiving the query via a communication protocol;
- parsing and analyzing the received query:
- retrieving an answer corresponding to the parsed and analyzed query from a mailbox of the sender, wherein the mailbox of the sender includes emails associated with the parsed and analyzed query;
- sending the answer to the second computing device; and
- initiating display of the answer via the avatar on the second computing device.

18. The non-transitory computer-readable of claim 17, wherein the embedded avatar represents the sender.

19. The non-transitory computer-readable of claim 17, wherein the corresponding answer is retrieved from one or more of: an agenda, a folder, a previous answer, a calendar, a resume, and an expert system with artificial intelligence.

20. The non-transitory computer-readable of claim 17, wherein the memory further stores instructions for causing the computer system to perform operations comprising: sending a notification indicating the query to the sender based on a rule.

* * * * *

UNITED STATES PATENT AND TRADEMARK OFFICE
CERTIFICATE OF CORRECTION

PATENT NO. : 10,158,589 B2
APPLICATION NO. : 15/661953
DATED : December 18, 2018
INVENTOR(S) : Collet et al.

Page 1 of 1

It is certified that error appears in the above-identified patent and that said Letters Patent is hereby corrected as shown below:

In the Claims

In Column 14, Line 20, in Claim 1, delete "query:" and insert --query;-- therefor In Column 15, Line 17, in Claim 9, delete "query:" and insert --query;-- therefor In Column 15, Line 40, in Claim 14, delete "format:" and insert --format;-- therefor In Column 16, Line 7, in Claim 15, delete "protocol" and insert --protocol,-- therefor In Column 16, Lines 20-21, in Claim 17, delete "avatar:" and insert --avatar;-- therefor Signed and Sealed this
Twenty-eighth Day of April, 2020

Andrei Iancu
*Director of the United States Patent and Trademark Office*